United States Patent [19]

Harafuji et al.

[11] Patent Number: 4,728,807

[45] Date of Patent: Mar. 1, 1988

[54] POWER SOURCE SYSTEM COMPRISING A PLURALITY OF POWER SOURCES HAVING NEGATIVE RESISTANCE CHARACTERISTICS

[75] Inventors: Yoshihiko Harafuji; Hideki Yamamoto; Tsutomu Ogata, all of Tokyo, Japan

[73] Assignees: NEC Corporation; Nippon Telegraph and Telephone Corporation, both of Japan

[21] Appl. No.: 761,745

[22] Filed: Aug. 1, 1985

[30] Foreign Application Priority Data

Aug. 2, 1984 [JP] Japan ................................ 59-163090

Aug. 2, 1984 [JP] Japan ................................ 59-163091

[51] Int. Cl.[4] ................................................ H02J 9/06

[52] U.S. Cl. ........................................ 307/52; 307/48; 307/64

[58] Field of Search ....................... 307/46, 48, 49, 51, 307/52, 53, 54, 55, 60, 61, 63, 64, 65, 66, 77, 86, 87, 116, 131; 323/299, 302, 310, 268, 269, 270; 324/127; 361/79, 90

[56] References Cited

U.S. PATENT DOCUMENTS

| | | | |
|---|---|---|---|
| 3,293,444 | 12/1966 | Hagopian | 307/66 |
| 3,297,880 | 1/1967 | Clarke | 307/60 X |
| 3,343,067 | 9/1967 | Mesenhimer | 307/87 X |
| 3,428,820 | 2/1969 | Lyon | 307/64 |
| 3,689,776 | 9/1972 | Evans | 307/66 |
| 3,696,286 | 10/1972 | Ule | 307/66 X |
| 3,738,371 | 6/1973 | Raddi et al. | 307/48 X |
| 3,768,012 | 10/1973 | Wilkinson | 324/127 |
| 3,808,452 | 4/1974 | Hutchinson | 307/64 |
| 3,912,940 | 10/1975 | Vince | 307/64 |
| 3,922,559 | 11/1975 | Milgeon | 307/64 |
| 3,956,638 | 5/1976 | Ahrens et al. | 307/48 |
| 4,429,233 | 1/1984 | Kammiller | 307/64 X |
| 4,449,057 | 5/1984 | Ishiwata | 307/51 X |
| 4,476,399 | 10/1984 | Yoshida et al. | 307/60 X |
| 4,492,919 | 1/1985 | Milkovic | 324/127 |

FOREIGN PATENT DOCUMENTS

| | | | |
|---|---|---|---|
| 0118543 | 9/1979 | Japan | 307/52 |
| 01643317 | 10/1982 | Japan | 307/52 |

*Primary Examiner*—William M. Shoop, Jr.

*Assistant Examiner*—Paul Ip

*Attorney, Agent, or Firm*—Laff, Whitesel, Conte & Saret

[57] ABSTRACT

In a power source system for supplying a load with a load voltage and a load current, a plurality of power sources share the load at rates of load sharing and have negative resistance characteristics. When the power sources are connected together in series, the rates are determined by source voltages produced by the respective power sources which also produce d.c. currents. Each d.c. current increases with an increment of each rate so as to specify each negative resistance characteristic. A control circuit is included in each power source to control the d.c. current and may be a combination of a current detector (60*a*, 60*b*) and a resistor (56*a*, 56*b*). Alternatively, the rates are determined by source currents produced by the respective power sources which also produce d.c. voltages when the power sources are connected together in parallel. The d.c. voltages are controlled by control circuits to specify the negative resistance characteristics so that each d.c. voltage increases with an increment of each source current. Each negative resistance characteristic may be changed to a positive resistance characteristic at a preselected one of each rate.

5 Claims, 15 Drawing Figures

POWER SOURCE SYSTEM COMPRISING A PLURALITY OF POWER SOURCES HAVING NEGATIVE RESISTANCE CHARACTERISTICS

BACKGROUND OF THE INVENTION

This invention relates to a power source system for use in supplying a load with electric power from a plurality of power sources.

As will later be described with reference to several figures of the accompanying drawing, such a conventional power source system comprises a plurality of power sources which are connected either in series or parallel to one another. A load is connected to the power source system through a transmission path, such as a coaxial cable, an optical fiber, or the like and is supplied with a load voltage and a load current from the power source system. The load becomes active when the load voltage and the load current exceed a minimum voltage and a minimum current, respectively. Such a minimum voltage or current will be called a minimum level.

In a series connection of the power sources, the load voltage is substantially equal to a sum of source voltages produced by the respective power sources while the load current is substantially equal to a source current produced by each power source. From this fact, it is understood that the power source share the load at rates of load sharing determined by the source voltages of the respective power sources.

In a parallel connection of the power sources, the load current is substantially equal to a sum of source current produced by the respective power sources while the load voltage is substantially equal to a source voltage produced by each power source. In this event, the source current serve to determine the rates.

In both of the series and the parallel connections of the power sources, it will be noted that selected ones of electric components for determining the rates are called first electric components while the other electric components are called second electric components. At any rate, the second electric components are gradually reduced when the rates become heavy as a result of an increase of the first electric components. This means that each power circuit has a positive resistance characteristic.

It is assumed that one of the power sources interrupts its source voltage and current due to an occurence of a fault and that the rate of the one power source is reduced to zero. The remaining power source should be operated at a maximum rate and must keep either the load current or the load voltage greater than the minimum current or voltage, even on an occurrence of the fault in the one power source. Stated otherwise, the second electric components must be kept at a level greater than the minimum level.

Inasmuch as each power source has a positive resistance characteristic in the manner pointed out hereinabove, the second electric components are reduced to the minimum level when the remaining power source is opeated at the maximum rate. In addition, the load must favorably be put into operation even when the second electric components have the minimum level. This means that the minimum level of the second electric components should be higher than the minimum current or the minimum voltage.

An extra or superfluous electric power should therefore be supplied from the remaining power source to the load in consideration of a fault of the above-mentioned one power source. The superfluous electric power excessively heats the load and requires the load to include a radiator of a big size. This makes the load large in size and expensive.

SUMMARY OF THE INVENTION

It is an object of this invention to provide a power source system which can avoid supply of an extra electric power.

It is another object of this invention to provide a power source system of the type described, which serves to reduce the size and expense of the load, thereby eliminating an otherwise bulky and expensive load which could be useless.

According to this invention, there is provided a power source system which is for supplying a load with a load voltage and a load current and which comprises a plurality of power sources, each for producing a first and a second source component, and coupling means for coupling the power sources together to the load to deliver the first and the second source components of the respective power sources to the load as a predetermined one and the other of the load voltage and current, respectively, with rates of the first source components left variable and with the second source component of each power source left variable when the rate of the first source component thereof varies between a low and a high normalized value, wherein each power source comprises an electric source for producing an electric component corresponding to said second source component and controlling means for controlling the electric component in accordance with a negative resistance characteristic to produce the first and the second source components with the second source component made to increase when the rate of the first source component increases from the low normalized value towards the high normalized value.

DESCRIPTION OF THE PREFERRED EMBODIMENTS

Figure 1:
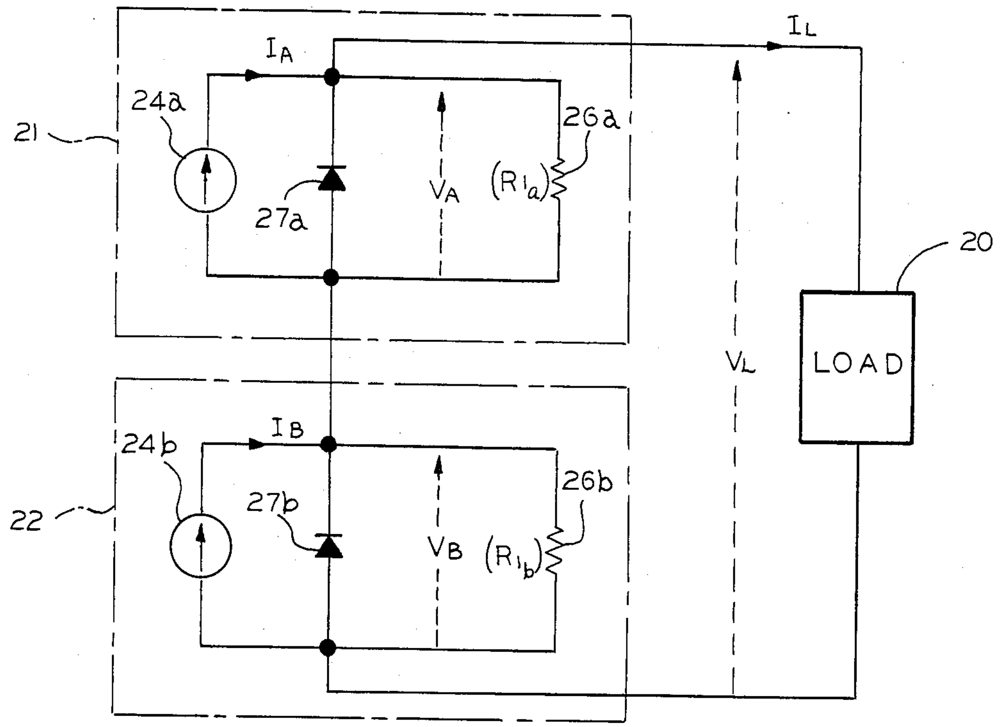
FIG. 1 (PRIOR ART)
FIG. 1 shows a block diagram of a conventional power source system together with a load.
Figure 2:
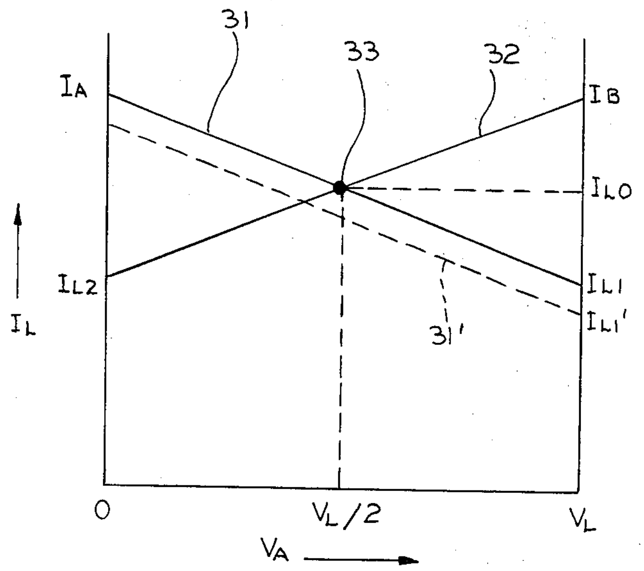
FIG. 2 (PRIOR ART)
FIG. 2 is a graphical representation for use in describing operation of the conventional power source system illustrated in FIG. 1.

Referring to FIGS. 1 and 2, a conventional power source system will be described for a better understanding of this invention. The power source system is for use in supplying a load 20 with a load voltage $V_L$ and a load current $I_L$. It is assumed that the illustrated load 20 becomes active when the load current $I_L$ exceeds a minimum load current $I_m$.

In FIG. 1, the power source system comprises a first power source 21 and a second power source 22 connected in series with the first power source 21. The first power source 21 comprises a first current source 24*a*, a first resistor 26*a* of a resistance $R_{1a}$ connected in parallel to the first current source 24*a*, and a first diode 27*a* connected in parallel to the first current source 24*a*. The first resistor 26*a* is for making the first power source 21 share the load 20 while the first diode 27*a* forms a bypass circuit when the first current source 24*a* becomes inactive due to an occurrence of a fault, as will become clear as the description proceeds.

When the first current source 24*a* becomes active during a normal operation, a first d.c. current $I_A$ is produced from the first current source 24*a* to develop a first source voltage $V_A$ across the first resistor 26*a*.

Likewise, the second power source 22 comprises a second current source 24*b*, a second resistor 26*b*, and a second diode 27*b*. The second resistor 26*b* has the same resistance $R_{1b}$ as the first resistor 26*a*. A second d.c. current $I_B$ is produced from the second current source 24*b* to develop a second source voltage $V_B$ across the second resistor 26*b* when the second current source 24*a* becomes active.

Inasmuch as the first power source 21 is connected in series to the second power source 22, the load voltage $V_L$ is substantially equal to a sum of the first and the second source voltages $V_A$ and $V_B$. In addition, each of the first and the second power sources 21 and 22 produces a source current substantially equal to the load current $I_L$.

From this fact, it is readily understood that the load 20 is shared by the first and the second power sources 21 and 22 at rates of load sharing determined by the first and the second source voltages $V_A$ and $V_B$, respectively. Each of the first and the second source voltages $V_A$ and $V_B$ will be referred to as a first source component for determining the rates while each of the source currents will be referred to as a second source component.

The load current $I_L$ is given by:

$$I_L = I_A - (V_A/R_{1a}), \quad (1)$$

$$= I_B - ((V_L - V_A)/R_{1b}). \quad (2)$$

In FIG. 2, the abscissa and the ordinate represent the first source voltage $V_A$ and the load current $I_L$, respectively. The first source voltage $V_A$ is varied between zero and the load voltage $V_L$ along the abscissa. In this event, Equation (1) can be made to correspond to a first characteristic 31. As will be understood from the first characteristic 31, the load current $I_L$ is reduced with an increase of the first source voltage $V_A$. More specifically, the load current $I_L$ is varied from the first d.c. current $I_A$ and a first minimum current $I_{L1}$ which is given by:

$$I_{L1}=I_A-(V_L/R_{1a}).$$

On the other hand, Equation (2) can be made to correspond to a second characteristic 32 in which the load current $I_L$ is varied between the second d.c. current $I_B$ and a second minimum current $I_{L2}$ in a manner similar to the first characteristic 31.

Each of the first and the second characteristics 31 and 32 may be named a positive resistance characteristic.

The first charactristic 31 intersects the second characteristic 32 at a cross point 33. When the first and the second power sources 21 and 22 simultaneously run or operate and produce the first and the second d.c. currents $I_A$ and $I_B$ equal to each other, the operation is carried out at the cross point 33 of the first and the second characteristics 31 and 32. In this event, the load current $I_L$ becomes equal to a normal load current $I_{L0}$, as illustrated in FIG. 2. Inasmuch as the resistance $R_{1a}$ of the first resistor 26*a* is identical with that of the second resistor 26*b*, the first source voltage $V_A$ becomes equal to the second source voltage $V_B$ and to a half of the load voltage $V_L$.

Under the circumstances, the first and the second power sources 21 and 22 equally share the load 20.

Now, it is assumed that the operation second power source 22 is interrupted and that only the first power source 21 bears the entire load 20, with the second diode 27*b* conductive.

In the illustrated power source system, the load 20 should favorably be operated even when the second power source 22 becomes inactive. Accordingly, the first minimum current $I_{L1}$ must be greater than the minimum load current $I_m$ of the load 20. Practically, the first characteristic 31 may be reduced to a lower limit depicted at a broken line 31' due to a variation of the first current source 21. As a result, the first minimum current $I_{L1}$ may decrease to a practical minimum current $I_{L1}'$. The practical minimum current $I_{L1}'$ should therefore be kept greater than the minimum load current $I_m$.

Similarly, the second minimum current $I_{L2}$ must be greater than the minimum load current $I_m$ in consideration of a variation of the second current source 22.

Thus, each of the first and the second d.c. currents $I_A$ and $I_B$ is selected so that the load 20 is kept active even when either one of the first and the second power sources 21 and 22 is interrupted. This results in an increase of the normal load current $I_{L0}$ which is produced by each of the first and the second power sources 21 and 22 during the normal operation. For example, the normal load current $I_{L0}$ must be greater than the minimum load current $I_m$ at least by a current increment represented by $(I_{L0}-I_{L1}')$. Specifically, the current increment is given by:

$$I_{L0}-I_{L1}'=(V_L/2R_{1a})+\Delta I_A, \quad (3)$$

where $\Delta I_A=I_{L1}-I_{L1}'$.

It is possible to reduce the current increment by increasing the resistance $R_1$ $R_{1a}$, $R_{1b}$ (respectively) of each of the first and the second resistors 26a and 26b. However, an increase of each resistance $R_1$ $R_{1a}$, $R_{1b}$ gives rise to a wide variation of each of the first and the second source voltages $V_A$ and $V_B$ even when each of the first and the second d.c. currents $I_A$ and $I_B$ is slightly changed. Consequently, inequality of load sharing rates takes place between the first and the second power sources 21 and 22 on the normal operation and brings about inequality of the first and the second source voltages $V_A$ and $V_B$. The inequality of the first and the second source voltages $V_A$ and $V_B$ should be restricted to a predetermined range, in the manner known in the art.

Accordingly, a reduction of the normal load current $I_{L0}$ can not exceed a certain limit. The normal load current $I_{L0}$ must superfluously be supplied to the load 20. Therefore, the illustrated power source system has a disadvantage as pointed out in the preamble of the instant specification.

Figure 3:
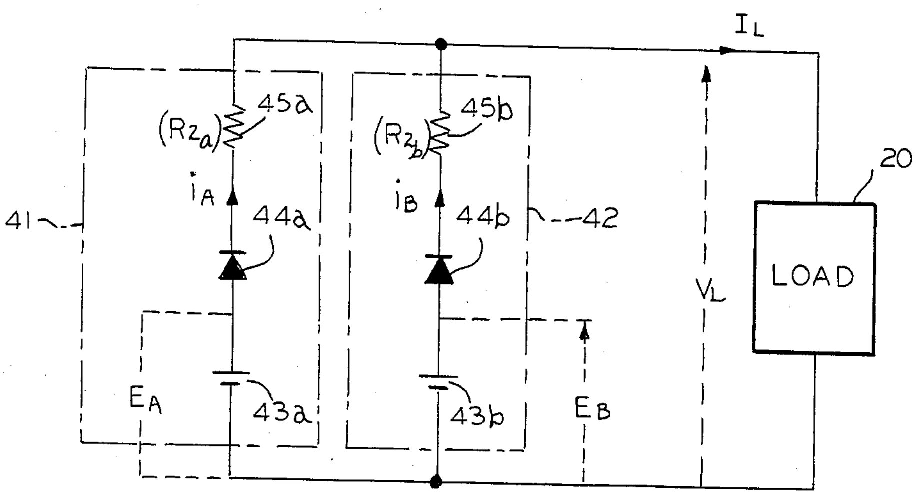
FIG. 3 (PRIOR ART)
FIG. 3 shows a block diagram of another conventional power source system together with a load.
Figure 4:
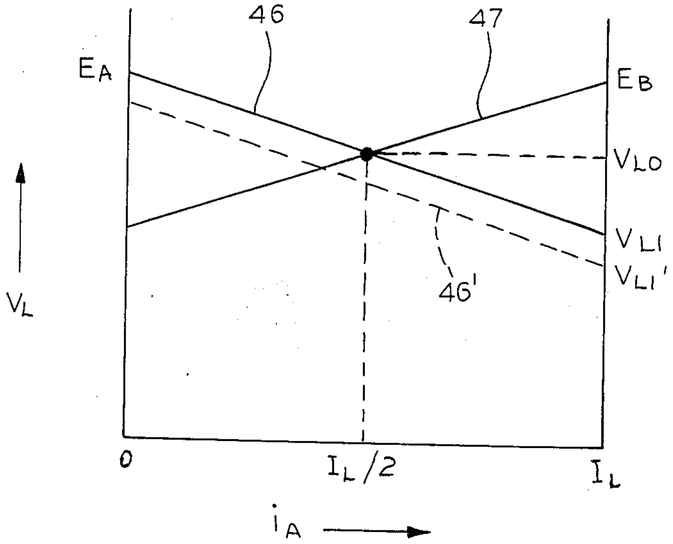
FIG. 4 (PRIOR ART)
FIG. 4 is a graphical representation for use in describing an operation of the power source illustrated in FIG. 3.

Referring to FIGS. 3 and 4, another conventional power source system comprises first and second power sources which are indicated at 41 and 42 and which are connected together in parallel. The power source system illustrated in FIG. 3 has a duality relation to that illustrated in FIG. 1 and is for use in supplying a load depicted at 20 with a load current $I_L$ and a load voltage $V_L$, like in FIG. 1. It is assumed that the load 20 has a minimum load voltage $V_m$ at which the load 20 becomes active.

The first power source 41 comprises a first voltage source 43a, a first series diode 44a, and a first series resistor 45a, which are all connected in series. The first voltage source 43a produces a first d.c. voltage $E_A$. The first series resistor 45a has a resistance $R_{2a}$ and is for determining a rate of load sharing like each of the first and the second resistors 27a and 27b (FIG. 1) while the first series diode 44a serves to isolate the first power source 41 from the power source system when the first voltage source 43a becomes inactive.

Likewise, the second power source 42 comprises a second voltage source 43b for producing a second d.c. voltage $E_B$, a second series diode 44b, and a second series resistor 45b having the same resistance $R_{2b}$ as the first series resistor 45a.

Anyway, the first and the second power sources 41 and 42 produce first and second source currents $i_A$ and $i_B$ determined by the first and the second series resistors 45a and 45b, respectively. In addition, each of the first and the second power sources 41 and 42 produces a source voltage which is substantially equal to the load voltage $V_L$. It is readily understood that the first and the second power sources 41 and 42 share the load 20 at the rates determined by the first and the second source currents $i_A$ and $i_B$. In this connection, each of the first and the second source currents $i_A$ and $i_B$ will be called a first source component while each of the source voltages will be called a second source component.

As readily understood from FIG. 3, the load voltage $V_L$ is given by:

$$V_L = E_A - R_{2a}\cdot i_A \quad (4)$$

and $$= E_B - R_{2b}\cdot(I_L - i_A). \quad (5)$$

First and second operation characteristics 46 and 47 are graphical representations of Equations (4) and (5), respectively. As shown by the first operation characteristic 46, the load voltage $V_L$ is gradually reduced from the first d.c. voltage $E_A$ with an increase of the first source current $i_A$. Likewise, the load voltage $V_L$ is reduced as the second source current $i_B$ increases, as readily understood from the second operation characteristic 47.

When the first and the second power sources 41 and 42 are simultaneously operated with the first and the second d.c. voltages $E_A$ and $E_B$ equal to each other, the first source current $i_A$ becomes equal to the second source current $i_B$. In this event, each of the first and the second source currents $i_A$ and $i_B$ becomes equal to a half $(I_L/2)$ of the load current. As a result, the load 20 is equally shared by the first and the second power sources 41 and 42 and is supplied with a normal load voltage $V_{L0}$ as the load voltage $V_L$.

Let the second power source 42 be interrupted for some reason. In this event, the second diode 44b is interrupted and the first power source 41 alone bears the load 20 by supplying the load current $I_L$ to the load 20. As shown in FIG. 4, the source voltage of the first power source 41 is reduced to a minimum source voltage $V_{L1}$. Practially, the first operation characteristic 46 may decrease to a practical characteristic depicted at 46' due to a variation of the first d.c. voltage $E_A$. The minimum source voltage $V_{L1}$ might be reduced to a practical minimum source voltage $V_{L1}'$. Under the circumstances, the minimum load voltage $V_m$ of the load 20 should be greater than the practical minimum source voltage $V_{L1}'$. This results in an increase of the normal load voltage $V_{L0}$. Specifically, a voltage difference between the normal load voltage $V_{L0}$ and the minimum load voltage $V_m$ is equal to or greater than that difference between the normal load voltage $V_{L0}$ and the practical minimum source voltage $V_{L1}'$ which is given by:

$$V_{L0}-V_{L1}'=(R_{2a}\cdot I_L/2)+\Delta E_A, \quad (6)$$

where $\Delta E_A=V_{L1}-V_{L1}'$.

Thus, the illustrated power source system has a disadvantage similar to that illustrated in FIG. 1.

Figure 5:
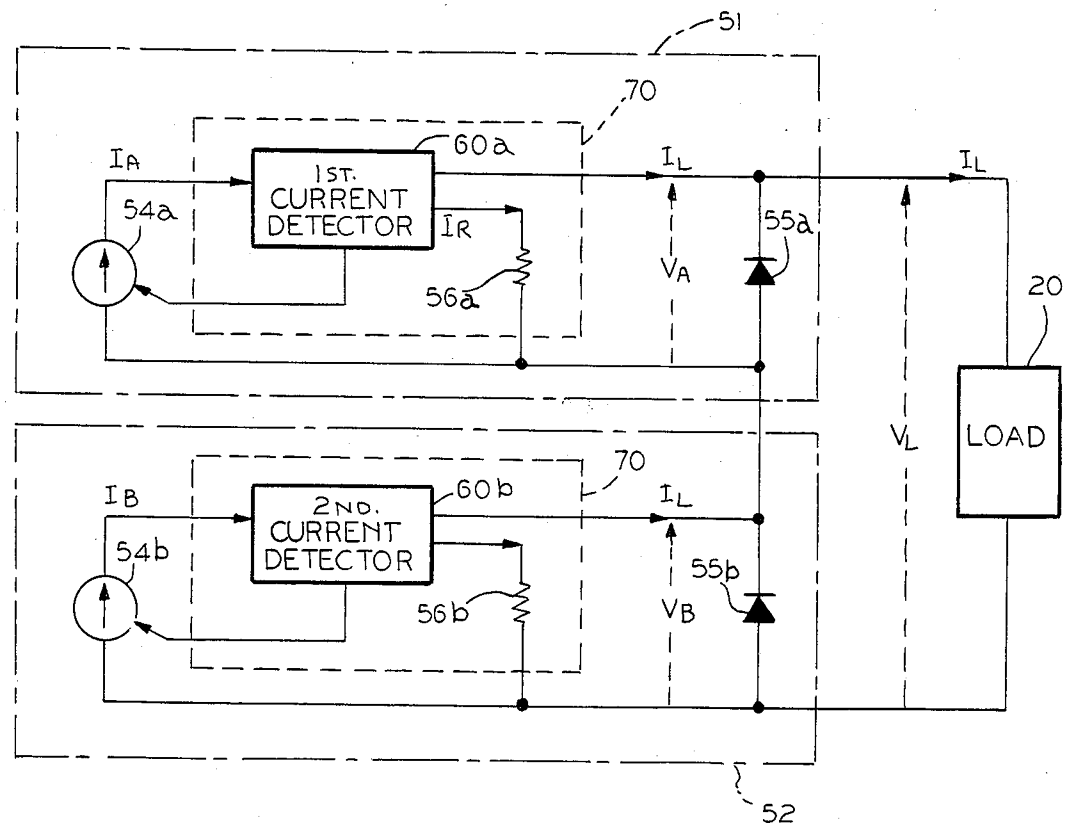
FIG. 5 shows a block diagram of a power source system according to a first embodiment of this invention together with a load.

Referring now to FIG. 5, a power source system according to a first embodiment of this invention comprises first and second power sources 51 and 52 which are connected together in series in a manner similar to the first and the second power sources 21 and 22 (FIG. 1) and which supply a load 20 with a load voltage $V_L$ and a load current $I_L$. The load 20 becomes active when the load current $I_L$ is equal to or greater than a minimum load current $I_m$, like in FIG. 1.

Ths first power source 51 produces a first source voltage $V_A$ and a first source current while the second power source 52 produces a second source voltage $V_B$ and a second source current. Each of the first and the second source voltages $V_A$ and $V_B$ serves to determine the rate of load sharing and may be called a first source component while each of the first and the second source currents is substantially equal to the load current $I_L$ and may be called a second source component.

More particularly, the first power source 51 comprises a first current source, a first diode, and a first resistor which are indicated at 54*a*, 55*a*, and 56*a*, respectively, and which are similar to those illustrated in FIG. 1. The first current source 54*a* is for producing a first d.c. current $I_A$ while the first resistor 56*a* is operable to produce a first shared voltage across the first resistor 56*a*. Likewise, the second power source 52 comprises a second current source 54*b*, a second diode 55*b*, and a second resistor 56*b* having the same resistance $R_{10}$ as the first resistor 56*a*. The second current source 54*b* is for producing a second d.c. current $I_B$ while the second resistor 56*b* isoperable to produce a second shared voltage across the second resistor 56*b*.

In the example being illustrated, the first and the second shared voltage are substantially equal to the first and the second source voltages $V_A$ and $V_B$, respectively, as will become clear later, and may be called first electric components. On the other hand, each of the first and the second d.c. currents $I_A$ and $I_B$ may be called a second electric component.

The first and the second power sources 51 and 52 further comprise first and second current detectors 60*a* and 60*b* responsive to the first and the second d.c. currents $I_A$ and $I_B$, respectively.

Figure 6:
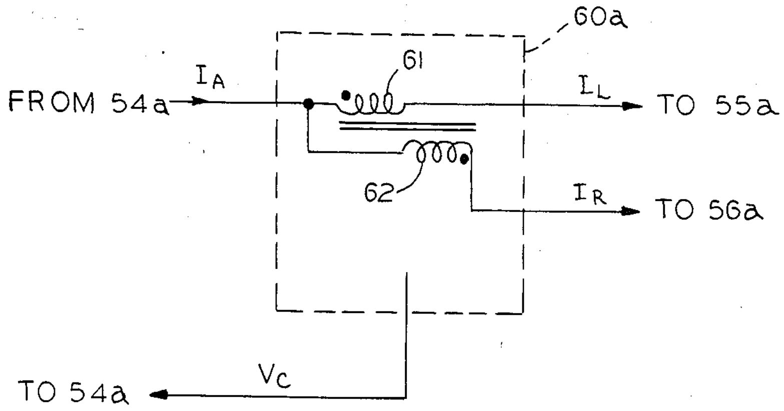
FIG. 6 is a circuit diagram of a current detector for use in the power source system illustrated in FIG. 5.

Referring to FIG. 6 afresh in addition to FIG. 5, the first current detector 60*a* comprises a magnetic amplifier composed of a saturable reactor. The saturable reactor comprises a first winding 61 connected to the first diode 55*a* and a second winding 62 having a terminal connected in common to the primary winding 61 and the other terminal connected to the first resistor 56*a*. The first and the second windings 61 and 62 have first and second numbers $N_1$ and $N_2$ of turns, respectively. It is presumed that the second number $N_2$ of turns is greater than the first number $N_1$ of turns.

The first d.c. current $I_A$ is supplied to the first current detector 60*a* and is divided into first and second current which flow through the first and the second windings 61 and 62, respectively. The first current is delivered to the load 20 as the load current $I_L$ to the load 20 while the second current is delivered to the first resistor 56*a*. The second current may therefore be referred to as a resistor current $I_R$.

Moreover, the first current detector 60*a* produces a control signal specified by a control voltage $V_c$ proportional to a linear combination of the first d.c. current $I_A$, the load current $I_L$, and the resistor current $I_R$. Specifically, the control voltage $V_c$ is represented by:

$$V_c=g_1\cdot I_A+g_2\cdot I_L+g_3\cdot I_R, \quad (7)$$

where $g_1$, $g_2$, and $g_3$ are representative of proportional constants selected in a manner to be described later. It suffices to say that at least one of the proportional constants $g_1$ and $g_2$ is not equal to zero.

The control voltage $V_c$ is sent from the first current detector 60*a* to the first current source 54*a* (FIG. 5). The illustrated first current source 54*a* comprises a comparator for comparing the control voltage $V_c$ with a predetermined reference voltage $V_s$ to produce a difference between the control voltage $V_c$ and the predetermined reference voltage $V_s$ and a level adjustment circuit for adjusting the first d.c. current $I_A$ in response to the difference so that the control voltage $V_c$ is coincident with the predetermined reference voltage $V_s$. The above-mentioned comparator and the level adjustment circuit are both known in the art and therefore not shown in FIG. 5.

Let the proportional constants $g_1$ through $g_3$ be determined with reference to FIGS. 5 and 6. It is assumed that the first source voltage $V_A$ becomes zero as a result of shorting a pair of output terminals of the first current source 54*a* and that the resultant first d.c. current $I_A$ becomes equal to $I_{A0}$. In this event, the resistor current $I_R$ becomes zero and the first d.c. current $I_A$ becomes equal to the load current $I_L$, provided that a reduction of voltage in the first current detector 60*a* is negligibly small. This means that the first source voltage $V_A$ is substantially equal to a voltage developed across the first resistor 56*a*.

Taking the above into consideration, the predetermined reference voltage $V_s$ is given with reference to Equation (7) by:

$$V_s=(g_1+g_2)\cdot I_{A0}. \quad (8)$$

If the predetermined reference voltage $V_s$ (Equation (8)) is equal to the control voltage $V_c$ (Equation (7)), the load current $I_L$ is represented by:

$$I_L=I_{A0}-G\cdot I_R=I_{A0}-G\cdot(V_A/R_{10}), \quad (9)$$

where $$G=(g_1+g_3)/(g_1+g_2). \quad (9')$$

It is mentioned here that a principle of this invention resides in rendering the factor G into a negative value. Such a negative value of the factor G can be accomplished when the proportional constant $g_3$ has a polarity or sign inverse relative to the other proportional constants $g_1$ and $g_2$ and furthermore has an absolute value greater than the proportional constant $g_1$.

In FIG. 6, the control voltage $V_c$ is assumed to be proportional to a difference of ampere turns between the first and the second windings 61 and 62. Under the circumstances, the control voltage $V_c$ is given by:

$$V_c=k(N_1 \cdot I_L-N_2 \cdot I_R). \quad (10)$$

In Equation (10), it is possible to substitute $g_2$ and $g_3$ for $kN_1$ and $-kN_2$, respectively. As a result, Equation (10) is rewritten into:

$$V_c=g_1 \cdot I_L+g_3 \cdot I_R. \quad (11)$$

Comparison of Equation (10) with Equation (7) shows that Equation (7) is equivalent to Equation (11) when the proportional constant $g_1$ of Equation (7) is equal to zero and the proportional constants $g_2$ and $g_3$ thereof have inverse polarities or signs relative to each other. Accordingly, the factor G becomes equal to $g_3/g_2$ and takes a negative value.

The second power source 52 is similar in structure and operation to the first power source 51 and will therefore not be described any longer. As regards the second power source 52, a relationship similar to Equation (9) holds and is given by:

$$I_L=I_{B0}-G \cdot (V_L-V_A)/R_{10}, \quad (12)$$

where $I_{B0}$ is similar to $I_{A0}$ described in conjunction with the first power source 51.

Figure 7:
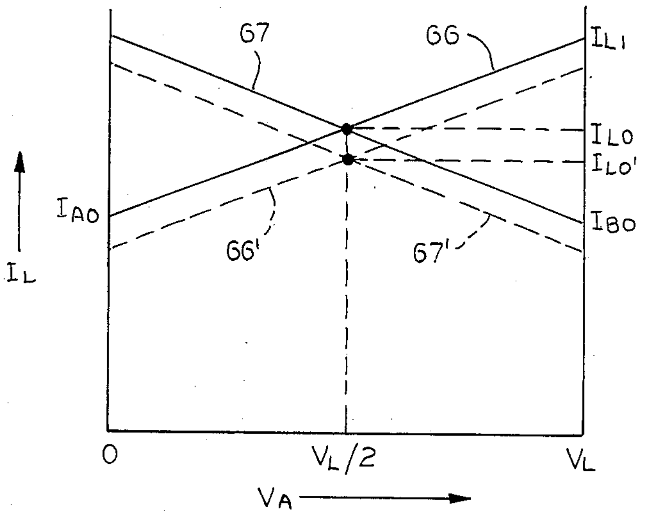
FIG. 7 is a graph for use in describing an operation of the power source system illustrated in FIG. 5.

Referring to FIG. 7, wherein the abscissa and the ordinate represent the first source voltage $V_A$ and the load current $I_L$, respectively, first and second specific characteristics 66 and 67 show relationships of Equations (9) and (12), respectively. Inasmuch as the factor G of each of Equations (9) and (12) takes a negative value in the manner mentioned before, gradients of the first and the second specific characteristics 66 and 67 are inverse relative to those of the first and the second characteristics 31 and 32 illustrated in FIG. 2. As to the first specific characteristic 66, the load current $I_L$ gradually increases from $I_{A0}$ with an increase of the first source voltage $V_A$. In other words, the load current $I_L$ increases as the rate of load sharing increases in the first power source 51 (FIG. 5).

As to the second specific characteristic 67, the load current $I_L$ also increases from $I_{B0}$ with an increase of the rate of the second power source 52.

Reviewing FIGS. 5 through 7, it is readily understood that a combination of each current detector 60 and each resistor 56 (suffixes omitted) is equivalent to a negative-resistance and may therefore be replaced by the negative-resistance. The combination of each current detector 60 and each resistor 56 may be named a control circuit 70 for controlling each of the first and the second d.c. currents $I_A$ and $I_B$. In this connection, the first and the second specific characteristics 6 and 67 will be referred to as first and second negative resistance characteristics, respectively.

Each of the first and the second negative resistance characteristics is practically variable within a controllable range, like each of the first and the second characteristics 31 and 32 illustrated in FIG. 2. In FIG. 7, first and second lower limit characteristics 66' and 67' are illustrated under the first and the second negative resistance characteristics 66 and 67 in consideration of practical variations thereof, respectively.

Anyway, each of the first and the second source voltages $V_A$ and $V_B$ is equal to a half ($V_L/2$) of the load voltage $V_L$ when the first and the second power sources 51 and 52 are operable at the same rates. In this event, the load current $I_L$ becomes equal to a normal load current $I_{L0}$ when the first and the second negative resistance characteristics 66 and 67 does not vary. When the first and the second negative resistance characteristics are reduced to the first and the second lower limit characteristics 66' and 67, respectively, the normal load current $I_{L0}$ decreases to a lower limit current $I_{L0}'$.

In the power source system illustrated in FIG. 5, let the minimum load current $I_m$ of the load 20 be lower than the lower limit current $I_{L0}'$. Under the circumstances, let the second current source **54*b* be interrupted and the second diode 55*b* be put into a conductive state. As a result, the first power source 51 solely bears the load 20 by producing the load voltage $V_L$. The first current source 54*a* produces the first d.c. current $I_A$ in accordance with the first negative resistance characteristic 66**. As a result, the load current $I_L$ increases to a maximum load current $I_{L1}$. The maximum load current $I_{L1}$ may be reduced to a lower limit of the maximum load current $I_{L1}$. At any rate, the maximum load current $I_{L1}$ and the lower limit thereof are greater than the minimum load current $I_m$.

Similar operation is carried out when the second power source 52 singly bears the load 20 as a result of interruption of the first power source.

In the interim, it is to be noted here that the load current $I_L$ does not become lower than the lower limit current $I_{L0}'$ even when either one of the first and the second current sources **54*a* and 54*b* is interrupted, as will be readily understood from FIG. 7. This means that the lower limit current $I_{L0}'$ of the normal load current $I_{L0}$ may be minimal and greater than the minimum load current $I_m$ of the load 20**. Specifically, a difference ($I_{L0}-I_m$) between the normal load current $I_{L0}$ and the minimum load current $I_m$ may somewhat be greater than a difference between the normal load current $I_{L0}$ and the lower limit current $I_{L0}'$.

From this fact, it is understood that the difference between the normal load current $I_{L0}$ and the minimum load current $I_m$ can considerably be reduced as compared with the current increment shown by Equation (3). When both of the first and the second power sources 51 and 52 are put into a normal mode of operation, the normal load current $I_{L0}$ may be decreased in comparison with that of the conventional power source system illustrated in FIG. 1.

On the other hand, the load current $I_L$ increases from the normal load current $I_{L0}$ when interruption takes place due to occurrence of a fault in either one of the first and the second power sources 51 and 52 illustrated in FIG. 5. However, a time of interruption is extremely shorter than a time of the normal operation.

Accordingly, the load 20 may comprise a small size of a radiator which is included therein for radiation of heat generated by the load 20. The load 20 can thus be reduced in size and becomes economical.

Figure 8:
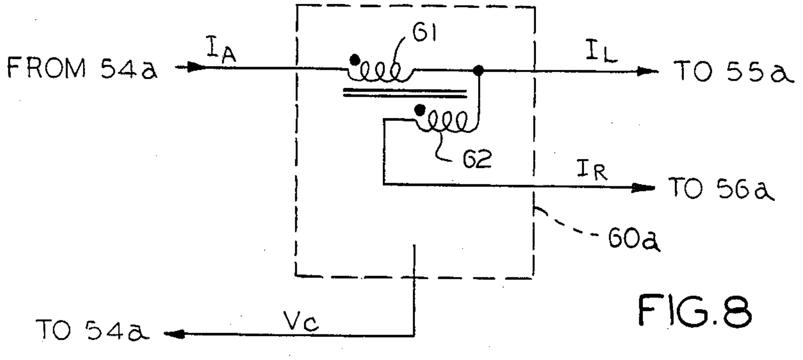
FIG. 8 is a circuit diagram of another current detector for use in the power source system illustrated in FIG. 5.

Referring to FIG. 8, another connection of the first current detector 60*a* comprises a first winding 61 supplied with the first d.c. current $I_A$. The first d.c. current $I_A$ passes through the first winding 61 and is thereafter divided into the load current $I_L$ and the resistor current $I_R$ which are delivered to the load 20 and the first resistor 56*a*, respectively. The resistor current $I_R$ flows through a second winding 62.

It is assumed that the first and the second windings 61 and 62 have first and second numbers $N_1$ and $N_2$ of turns, respectively, like in FIG. 6. In this event, the control voltage $V_c$ is given by:

$$V_c = k(N_1 \cdot I_A - N_2 \cdot I_R). \tag{13}$$

If the proportional constants $g_1$ and $g_2$ are substituted for $kN_1$ and $-kN_2$, Equation (13) is rewritten into:

$$V_c = g_1 \cdot I_A + g_3 \cdot I_R. \tag{13'}$$

Let Equation (7) be compared with Equation (13'). When the proportional constant $g_2$ of Equation (7) is equal to zero and when the proportional constants $g_1$ and $g_3$ have inverse polarities or signs relative to each other, Equation (7) becomes equal to Equation (13'). Therefore, the factor G is given with reference to Equation (9') by:

$$G = (g_1 + g_3)/g_1.$$

In the manner well known in the art, it is possible to render the factor G into a negative value by selecting the first and the second numbers $N_1$ and $N_2$ of turns. Specifically, the second number $N_2$ of turns may be greater than the first number $N_1$ of turns.

Although the first and the second negative resistance characteristics 66 and 67 are obtained by determining the proportional constants $g_1$ through $g_3$ in the above-mentioned manner, similar characteristics are achieved in the following manner. In FIG. 6, the first current detector 60*a* detects only the resistor current $I_L$ to produce the control voltage $V_c$ proportional to the resistor current $I_L$. It is assumed that the first current source 54*a* produces a predetermined current $I_{A0}$ (FIG. 7) and a first source current $I_A$ proportional to the resistor current $I_R$ when the control voltage $V_c$ is equal to zero and not, respectively. As a result, the first source current $I_A$ is given by:

$$I_A = I_{A0} + k_1 \cdot I_R,$$

where $k_1$ is representative of a proportional constant.

The load current $I_L$ $(= I_A - I_R)$ results in:

$$\begin{aligned} I_L &= I_{A0} + (k_1 - 1) \cdot I_R \\ &= I_{A0} + (k_1 - 1) \cdot (V_A/R_{10}). \end{aligned} \tag{14}$$

In Equation (14), the first negative resistance characteristic 66 (FIG. 7) is obtained when the proportional constant $k_1$ is greater than 1.

This similarly applies to the second power source 60*b*. Description will therefore be omitted as regards the second power source 60*b*.

Figure 9:
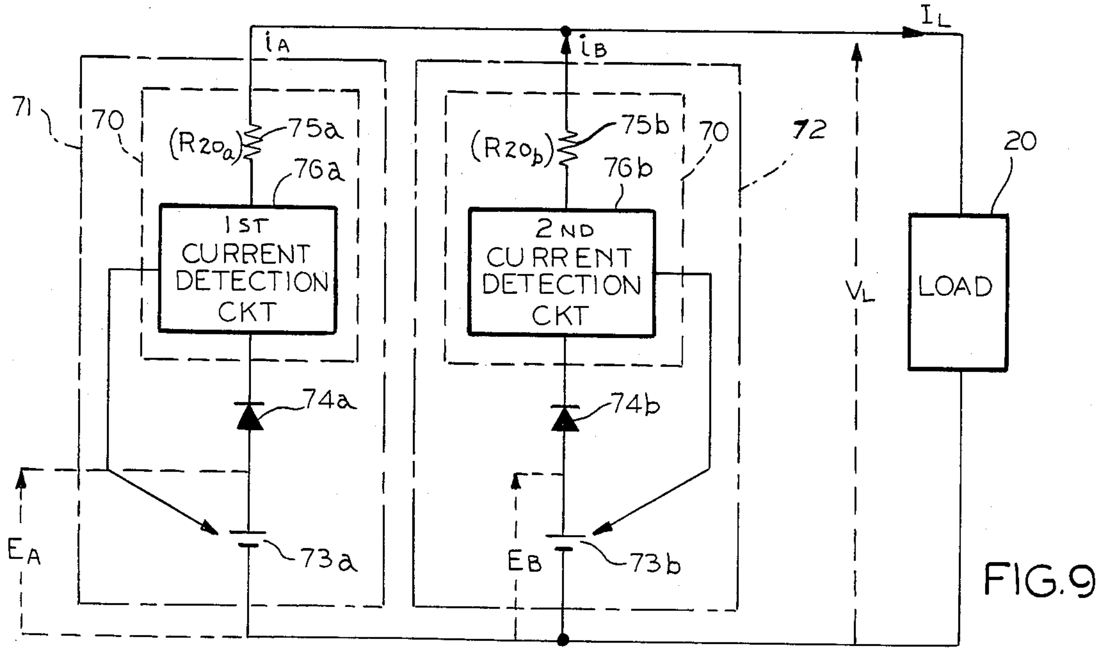
FIG. 9 shows a block diagram of a power source system according to a second embodiment of this invention together with a load.

Referring now to FIG. 9, a power source system according to a second embodiment of this invention comprises first and second power sources which are depicted at 71 and 72 and which are connected together in parallel like in FIG. 3.

The first power source 71 comprises a first voltage source 73*a*, a first series diode 74*a*, and a first series resistor 75*a*, which are operable in a manner similar to those illustrated in FIG. 3. The illustrated first power source 71 further comprises a first current detection circuit 76*a* which will be described later. Likewise, the second power source 72 comprises a second voltage source 73*b*, a second series diode 74*b*, a second series resistor 75*b*, and a second current detection circuit 76*b*, which are operable in a manner similar to those of the first power source 71, respectively. Accordingly, description will mainly be directed to the first power source 71.

The first power source 71 produces a first source current $i_A$ determined by the first series resistor 75*a* and a source voltage substantially equal to the load voltage $V_L$, like in FIG. 3. The first source current $i_A$ and the source voltage will be called a first and a second source component, respectively. Anyway, the first voltage source 73*a* is operable to produce a first d.c. voltage $E_A$ while the first series resistor 75*a* determines a first d.c. current. The first d.c. current and the first d.c. voltage $E_A$ may be called first and second electric components, respectively. As will be described later, the first d.c. current is delivered as the first source current $i_A$ to the load 20 while the first d.c. voltage $E_A$ is developed as the source voltage across the first power source 71.

In addition, a negative resistance may be substituted for a combination of the first current detection circuit 76*a* and the first series resistor 75*a*, like in FIG. 5. The combination of the first current detection circuit 76*a* and the first series resistor 75*a* serves to control the first d.c. voltage $E_A$ in accordance with a negative resistance characteristic to produce the first source current $i_A$ and the load voltage $V_L$ and will therefore be referred to as the control circuit 70.

Figure 10:
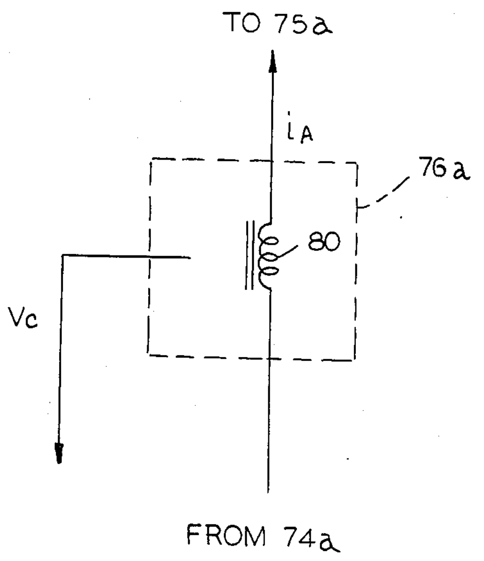
FIG. 10 is a circuit diagram of a current detection circuit for use in the power source system illustrated in FIG. 9.

Referring to FIG. 10 together with FIG. 9, the first current detection circuit 76*a* is composed of a magnetic amplifier comprising a saturable reactor. The illustrated saturable reactor comprises a d.c. winding 80 of a number N of turns. The d.c. winding 80 is placed between the first series diode 74*a* and the first series resistor 75*a* and allows the first source current $i_A$ to pass therethrough. In addition, a control voltage $V_c$ is derived from the d.c. winding 76*a* and delivered to the first voltage source 73*a*. The illustrated control voltage $V_c$ is proportional to an ampere turn of the winding 80. Accordingly, the control voltage $V_c$ is represented by:

$$V_c = k_3 \cdot N \cdot i_A, \quad (15)$$

where $k_3$ is a proportional constant.

The first voltage source 73*a* is controlled in accordance with the control voltage $V_c$ given by Equation (15). The illustrated first voltage source 73*a* produces a preselected voltage $E_{A0}$ when the control voltage $V_c$ is equal to zero. When the control voltage $V_c$ is not equal to zero, the first d.c. voltage $E_A$ becomes equal to a sum of the preselected voltage $E_{A0}$ and a variable voltage proportional to the first source circuit $i_A$. Accordingly, the first d.c. voltage $E_A$ can be represented by:

$$E_A = E_{A0} + k_4 \cdot i_A, \quad (16)$$

where $k_4$ is another proportional constant.

As a result of the above-mentioned voltage control, the load voltage $V_L$ is written with reference to Equation (16) into:

$$V_L = E_A - R_{20a} \cdot i_A, \quad (17)$$
$$= E_{A0} + (k_4 - R_{20b}) \cdot i_A.$$

If the proportional constant $k_4$ is greater than the resistance $R_{20b}$, namely, $(k_4 - R_{20b}) > 0$, the first power source 71 has the negative resistance characteristic which will be referred to as a first negative resistance characteristic.

Similar voltage control is carried out in the second power source 72. In this event, the load voltage $V_L$ is given by:

$$V_L = E_{B0} + (k_4 - R_{20b}) \cdot (I_L - i_A), \quad (18)$$

where $E_{B0}$ corresponds to the preselected voltage $E_{A0}$ and represents a preselected voltage of the second voltage source 73*b* appearing when the control voltage $V_c$ is equal to zero. Thus, the second power source 72 has a second negative resistance characteristic specified by Equation (18) when the proportional constant $k_4$ is greater than $R_{20}$.

Figure 11:
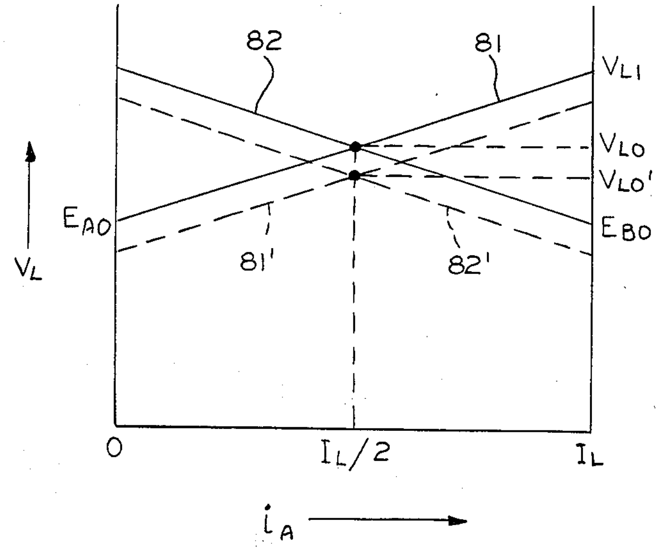
FIG. 11 is a graph for use in describing an operation of the power source system illustrated in FIG. 9.

Referring to FIG. 11, the first negative resistance characteristic is shown at 81. It is noted as regards the first negative resistance characteristic that the load voltage $V_L$ increases from the preselected voltage $E_{A0}$ to a maximum load voltage $V_{L1}$ as the first source current $i_A$ increases. Thus, the first negative resistance characteristic 81 rises to the right in FIG. 11. Practically, the characteristic 81 may be reduced to a first lower limit characteristic 81' within a controllable range when the first d.c. voltage $E_A$ is varied.

In FIG. 11, the second negative resistance characteristic is also shown at 82 and rises to the left. This means that the load voltage $V_L$ increases with an increase of the second source current $i_B$, namely, with a decrease of the first source current $i_A$. A second lower limit characteristic 82' is also illustrated in FIG. 11 in correspondence to the second negative resistance characteristic 82.

When the power source system carries out a normal operation, each of the first and the second power sources 71 and 72 shares the load 20 by producing each of the first and the second source currents $i_A$ and $i_B$ equal to a half $(I_L/2)$ of the load current $I_L$. In this event, the load voltage $V_L$ is equal to a normal load voltage $V_{L0}$ which may be reduced to a lower limit voltage $V_{L0}'$.

It is assumed that the load 20 has a minimum voltage $V_m$ lower than the lower limit voltage $V_{L0}'$.

For example, let the second voltage source 73*b* be interrupted in the power source system. The first voltage source 73*a* solely bears the load 20 by producing the first source current $i_A$ equal to the load current $I_L$. At this time, the source voltage of the first power source 71 increases to the maximum load voltage $V_{L1}$ in accordance with the first negative resistance characteristic 81. Inasmuch as maximum load voltage $V_{L1}$ is greater than the minimum voltage $V_m$ of the load 20, the load 20 is favorably operated even when the second voltage source 73*b* becomes faulty.

Similar operation is made in the case where the first voltage source 74*a* is interrupted.

With this structure, the normal load voltage $V_{L0}$ is selected so that a difference between the normal load voltage $V_{L0}$ and the minimum voltage $V_m$ slightly becomes greater than a difference between the normal load voltage $V_{L0}$ and the lower limit voltage $V_{L0}'$. The difference between the normal load voltage $V_{L0}$ and the minimum voltage $V_m$ can considerably be small in comparison with the voltage difference shown by Equation (6) in conjunction with the conventional power source system illustrated in FIGS. 3 and 4.

As mentioned before, a time of interruption of either one of the first and the second voltage sources 73*a* and 73*b* is extremely shorter than a time of the normal operation. Accordingly, the increase of the load voltage $V_L$ is transient. It is possible to prevent the load 20 from being superfluously heated. As a result, the load 20 becomes small in size and inexpensive, like in FIG. 5.

Figure 13:
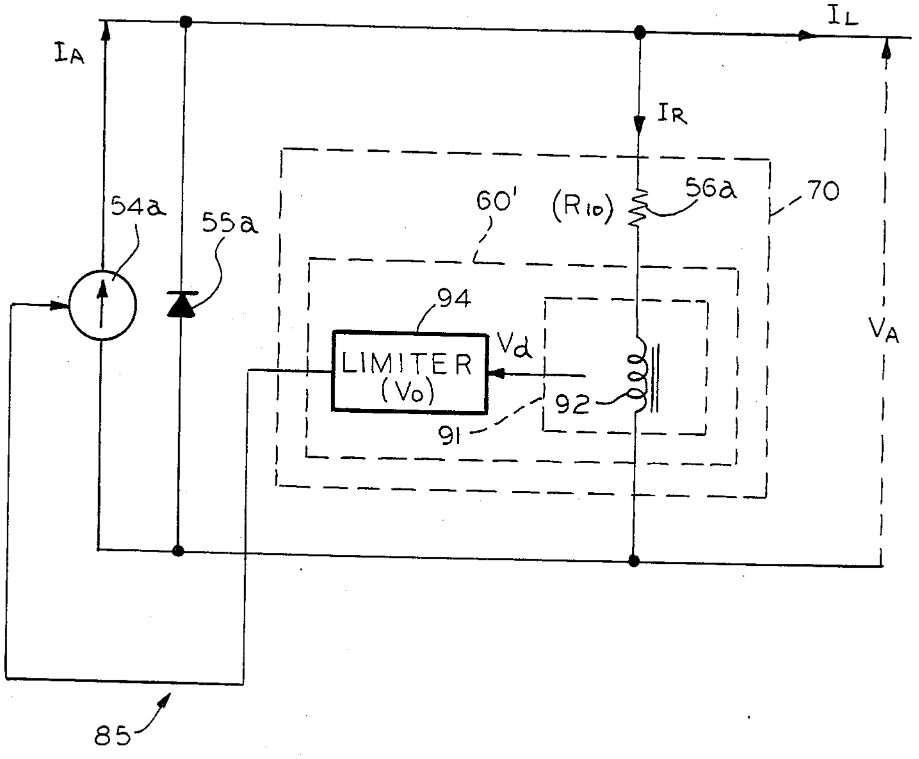
FIG. 13 shows a block diagram of a power source for use in the power source system according to the third embodiment.
Figure 12:
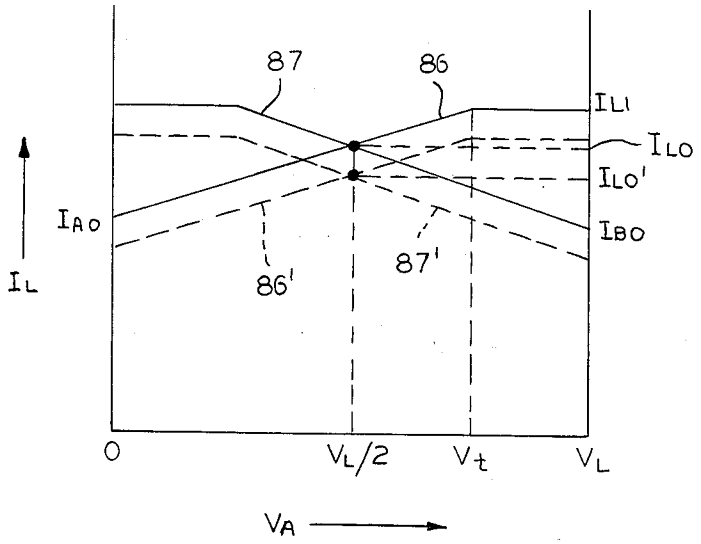
FIG. 12 is a graph for use in describing an operation of a power source system according to a third embodiment of this invention.

Referring to FIG. 5 again and FIGS. 12 and 13, a power source system according to a third embodiment of this invention comprises a power source (depicted at 85 in FIG. 13) substituted for each of the first and the second power sources 51 and 52 illustrated in FIG. 5. The power source 85 has first and second characteristic curves 86 and 87 (FIG. 12) when used as the first and the second power sources 51 and 52 (FIG. 5), respectively.

In FIG. 12, it is noted that each of the first and the second characteristic curves 86 and 87 partially shows a negative resistance characteristic like in FIG. 7 and is nonlinearly varied with an increase of each of the first and the second source voltages $V_A$ and $V_B$. More specifically, the first characteristic curve 86 shows a first resistance between zero and a transition voltage $V_t$ higher than the half $(V_L/2)$ of the load voltage and a second resistance between the transition voltage $V_t$ and the load voltage $V_L$. The transition voltage $V_t$ is representative of a preselected rate of load sharing. As understood from the first characteristic curve 86, the first resistance is a negative resistance and has a sufficiently small absolute value while the second resistance is a positive resistance.

Likewise, the second characteristic curve 87 is variable relative to the second source voltage $V_B$ in a manner similar to the first characteristic curve 86. Like in FIG. 7, lower limit characteristic curves 86' and 87' are illustrated in relation to the first and the second characteristic curves 86 and 87, respectively.

When each of the first and the second d.c. currents $I_A$ and $I_B$ is controlled in the above-mentioned manner, the normal load current $I_{L0}$ can approach the minimum current $I_m$ of the load 20 in comparison with that of the conventional power source system illustrated in FIG. 1. Accordingly, the load 20 may be small in size and inexpensive, as described in conjunction with FIG. 5.

Moreover, an increase of the load current $I_L$ can be reduced as compared with the power source system illustrated in FIG. 5 when a single one of the first and the second power sources alone is operated. This is because each of the first and the second d.c. currents $I_A$ and $I_B$ does not increase when each source voltage $V_A$ and $V_B$ exceeds the transition voltage $V_t$.

In order to accomplish the first and the second characteristics 86 and 87, the power source 85 is assumed to be used as the first power source 51 and comprises a current detector 60' illustrated in FIG. 13. Any other elements and signals are similar to those illustrated in FIGS. 5 and 6 and are therefore represented by the same reference numerals and symbols.

In FIG. 13, the first current source 54a is operable in cooperation with the current detector 60' in a manner similar to that illustrated in FIG. 5 and produces the first d.c. current $I_A$ which is divided into the load current $I_L$ and the resistor current $I_R$. The resistor current $I_R$ is supplied through the first resistor 56a to the current detector 60'.

The current detector 60' comprises a magnetic amplifier depicted at 91. The illustrated magnetic amplifier 91 comprises a d.c. winding 92 and produces a detection signal having a detection voltage $V_d$. The detection voltage $V_d$ is proportional to an ampere turn, namely, the resistor current $I_R$.

The detection voltage $V_d$ is sent to a limiter 94 for limiting the detection voltage $V_d$ when exceeds a prescribed reference voltage $V_O$. More particularly, the limiter 94 produces the detection voltage $V_d$ as a control voltage $V_c$ when the detection voltage $V_d$ is not greater than the prescribed reference voltage $V_O$. Otherwise, the limiter 94 produces the control voltage $V_c$ dependent on the prescribed reference voltage $V_O$. Accordingly, the control voltage $V_c$ is generally represented by:

$$V_c = V_d, \ (V_d \leqq V_O) \quad (19)$$

and $$V_c = V_O + g_4 \cdot (V_d - V_O), \ (V_d > V_O) \quad (19')$$

where $g_4$ is indicative of a proportional constant.

When the limiter 94 is used in the current detector 60', the proportional constant $g_4$ is equal to zero. As a result, the control voltage $V_c$ becomes equal to $V_O$ in Equation (19') when the detection voltage $V_d$ exceeds the prescribed reference voltage $V_O$.

Herein, a relationship between the detection voltage $V_d$ and the resistor current $I_R$ is given by:

$$V_d = g_5 \cdot I_R, \quad (20)$$

where $g_5$ represents a proportional constant.

A reduction of a voltage is extremely small in the current detector 60' and can be neglected. Under the circumstances, it is readily understood from FIG. 13 that the resistor current $I_R$ is represented by:

$$I_R = V_A / R_{10}. \quad (21)$$

It is assumed that the prescribed reference voltage $V_O$ is determined in consideration of the transition voltage $V_t$ in FIG. 12 and is given by:

$$V_O = g_5 \cdot V_t / R_{10}. \quad (22)$$

With reference to Equations (20) and (21), Equation (19) is rewritten into:

$$V_c = V_d = g_5 \cdot V_A / R_{10}. \quad (23)$$

Equation (23) represents the control voltage $V_c$ appearing when the first source voltage $V_A$ is not greater than the transition voltage $V_t$.

Similarly, Equation (19') is rewritten with reference to Equations (20) through (22) into:

$$V_c = g_5[V_t + g_4(V_A - V_t)] / R_{10}. \quad (24)$$

It is noted here that Equation (24) is representative of the control voltage $V_c$ appearing when the first source voltage $V_A$ is greater than the transition voltage $V_t$.

The first current source 54a is supplied with control voltage $V_c$ shown by Equation (23) or (24) and is subjected to current control in accordance with the control voltage $V_c$. Let a relationship between the control voltage $V_c$ and the first d.c. current $I_A$ be given by:

$$I_A = I_{A0} + k_5 \cdot V_c, \quad (25)$$

where $k_5$ is representative of an additional proportional constant. As understod from Equation (25), the first d.c. current $I_A$ is equal to $I_{A0}$ and is greater than $I_{A0}$ when $V_c=0$ and $V_c>0$, respectively.

When the first source voltage $V_A$ is not greater than the transistion voltage $V_t$, the load current $I_L$ is given by a difference between the first d.c. current $I_A$ and the resistor current $I_R$ and is rewritten with reference to Equations (23) and (25) into:

$$I_L = I_{A0} + (k_5 \cdot g_5 - 1) \cdot V_A / R_{10}. \quad (26)$$

On the other hand, when the first source voltage $V_A$ is greater than the transition voltage $V_t$, the load current $I_L$ is represented by:

$$I_L = I_{A0} + k_5 \cdot g_5(1-g_4) \cdot V_t/R_{10} + (k_5 \cdot g_4 \cdot g_5 - 1) \cdot V_A/R_{10}. \quad (27)$$

In Equation (26), it is possible to make a term of $k_5 \cdot g_5$ greater than 1 and to make a term of $R_{10}/(k_5 \cdot g_5 - 1)$ coincide with a desired value. Therefore, the negative resistance characteristic can be accomplished when the first d.c. voltage $V_A$ is not greater than the transition voltage $V_t$, as shown at 86 in FIG. 12. The first resistor 56*a* and the current detector 60' are equivalent to a negative resistor and will collectively be called a control circuit 70 as mentioned before.

In Equation (27), the proportional constant $g_4$ is equal to zero when the limiter 94 is used in the current detector 60'. Equation (27) is simplified into:

$$I_L = I_{A0} + k_5 \cdot g_5 \cdot V_t/R_{10} - V_A/R_{10}. \quad (27')$$

This shows that the positive resistance characteristic is attained between the transition voltage $V_t$ and the load voltage $V_L$, as illustrated at 86 in FIG. 12.

The above-mentioned fact applies to the case where the power source 85 illlustrated in FIG. 12 is used as the second power source 52 illustrated in FIG. 5. Anyway, a variation of the load current $I_L$ can be reduced by the use of the power source 85 when either one of the first and the second power sources 51 and 52 bears the load 20.

Figure 14:
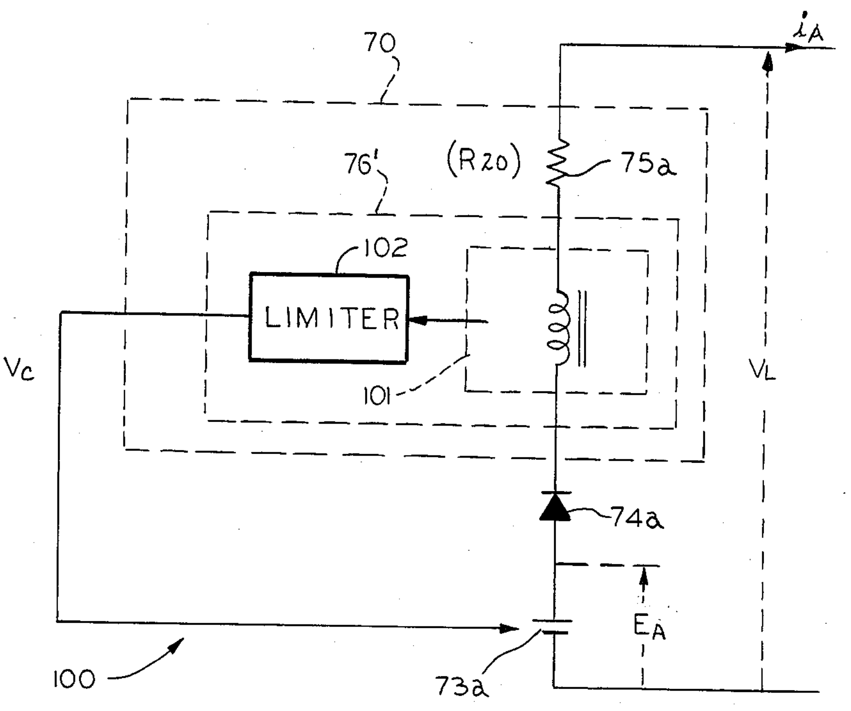
FIG. 14 shows a block diagram of a power source for use in a power source system according to a fourth embodiment of this invention.
Figure 15:
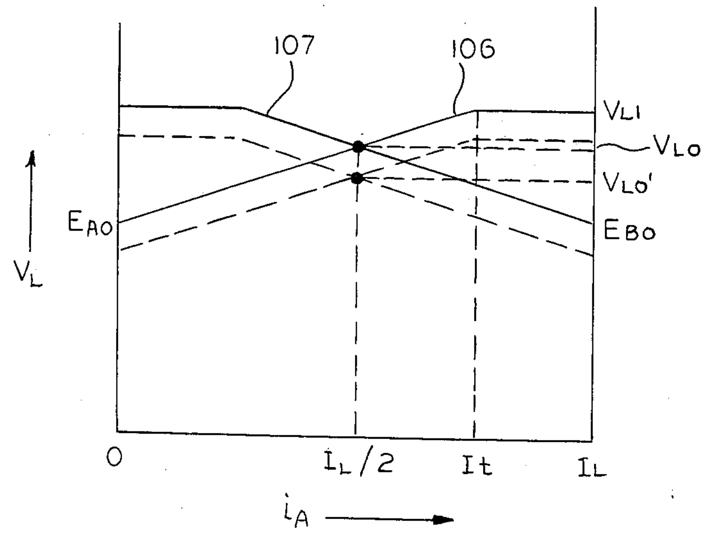
FIG. 15 is a graph for use in describing an operation of the power source illustrated in FIG. 14.

Referring to FIGS. 14 and 15, a power source system according to a fourth embodiment of this invention is similar to that illustrated in conjunction with FIGS. 9 and 11 except that a power source 100 (FIG. 14) has a nonlinear characteristic as illustrated in FIG. 15 9 and is operable as each of the first and the second power sources 71 and 72 (FIG. 9). For simplicity of description, it is presumed that the power source 100 illustrated in FIG. 14 is used as the first power source 71 (FIG. 9).

A current detection circuit 76' in the power source 100 is similar to the current detector 60' illustrated in FIG. 13 and comprises a magnetic amplifier and a limiter which are indicated at 101 and 102, respectively, so as to provide a first one of the nonlinear characteristic indicated at 106 in FIG. 15. It is needless to say that a second one of the nonlinear characteristic 107 is given by the second power source 72 (FIG. 9).

Anyway, each of the first and the second nonlinear characteristics 106 and 107 has a transistion current $I_t$ greater than a half of the load current $I_L$, although the transition current $I_t$ is illustrated only about the first nonlinear characteristic 106 in FIG. 15.

The first d.c. voltage $E_A$ is developed by the first voltage source 73*a* controllable in a manner to be described later. As a result, the first source current $i_A$ flows through the first diode 74*a*, the current detection circuit 76', and the first resistor 75*a*. The first source current $i_A$ is combined with the second source current $i_B$ (FIG. 9) to be supplied to the load 20 as the load current $I_L$, as illustrated in FIG. 9.

In FIG. 14, the first source current $i_A$ is detected by the current detection circuit 76'. The magnetic amplifier 101 produces a detection signal having a detection voltage $V_d$ in a manner similar to that illustrated in conjunction with FIG. 13. The detection voltage $V_d$ is therefore proportional to the first source current $i_A$ and is given by:

$$V_d = g_6 \cdot i_A, \quad (28)$$

where $g_6$ is representative of a proportional constant.

The detection voltage $V_d$ is sent to the limiter 102 for limiting the detection voltage $V_d$ at a preselected reference voltage $V_O$. The preselected reference voltage $V_O$ serves to provide the transition current $I_t$. The limiter 102 may be called a comparing circuit. The comparing circuit produces a control voltage $V_c$ by comparing the detection voltage $V_d$ with the preselected reference voltage $V_O$. When $V_d \leqq V_O$, the comparing circuit produces the control voltage $V_c$ given by:

$$V_c = V_d.$$

When $V_d > V_O$, the comparing circuit produces the control voltage $V_c$ represented by:

$$V_c = V_O + g_7(V_d - V_O),$$

where $g_7$ represents a proportional constant.

Herein, the preselected reference voltage $V_O$ is determined in consideration of the transition current $I_t$ and is given by:

$$V_O = g_6 \cdot I_t.$$

Accordingly, when $V_d \leqq V_O$, namely, $i_A \leqq I_t$, the control voltage $V_c$ is given by:

$$V_c = V_d = g_6 \cdot i_A. \quad (29)$$

When $V_d > V_O$, namely, $i_A > I_t$, the control voltage $V_c$ results in:

$$V_c = g_6 \cdot (I_t + g_7 \cdot (i_A - I_t)). \quad (30)$$

On the other hand, the first d.c. voltage $E_A$ of the first voltage source 73*a* is given by:

$$E_A = E_{A0} + k_6 \cdot V_c. \quad (31)$$

The load voltage $V_L$ is equal to a difference between the first d.c. voltage $E_A$ and a voltage across the first resistor 75*a* and is represented with reference to Equations (29) to (31) by:

$$V_L = E_{A0} + (k_6 \cdot g_6 - R_{20}) \cdot i_A, \ (i_A \leqq I_t) \quad (32)$$

and $$V_L = E_{A0} + k_6 \cdot g_6 \cdot (1 - g_7) \cdot I_t + (k_6 \cdot g_6 \cdot g_7 - R_{20}) \cdot i_A \cdot (i_A > I_t) \quad (33)$$

In Equation (32), it is readily possible to make $(k_6 \cdot g_6 - R_{20})$ a positive value. This means that the load voltage $V_L$ increases with an increment of the first source current $i_A$ when the first source current $i_A$ is not greater than $I_t$. Therefore, the first nonlinear characteristic 106 partially has a negative resistance characteristic.

In Equation (33), it is possible to select the third term of $(k_6 \cdot g_6 \cdot g_7 - R_{20})$ so that a value of the term becomes equal to a desired value equal to or smaller than zero. Thus, the first nonlinear characteristic 106 can have a positive resistance characteristic when the first source current $i_A$ exceeds the transition current $I_t$.

Similar operation is also carried out in the second power source 72 (FIG. 9).

With this structure, an increase of the load voltage $V_L$ can be avoided in comparison with the power source system illustrated in FIG. 9. In addition, the normal load voltage $V_{L0}$ can approach the minimum voltage $V_m$ of the load 20 like in FIG. 9.

While this invention has thus far been described in conjunction with several embodiments thereof, it will readily be possible for those skilled in the art to put this invention into practice in various other manners. For example, a voltage detector may be used instead of each current detector illustrated in FIGS. 5, 9, 13, and 14. In this case, the voltage detector may monitor a voltage across the resistor, such as 56, 75.

What is claimed is:

1. A power source system for supplying a load with a load voltage and a load current, said system comprising a plurality of power sources, each of said power sources producing a source voltage and a source current, and coupling means for coupling said power source together in series with said load in order to deliver the source voltages of the respective power sources to said load as said load voltages, with rates determined by the source voltages of the respective power sources and with the source current of each of said power sources being variable when each of said rates is varied between low and high normalized values, each power source comprising:

an electric source for producing said source current as a source signal; and detecting means coupled to said electric source for detecting said source signal to produce first and second currents in accordance with a negative resistance characteristic which is such that the source current increases when the rate increases from said low normalized value toward said high normalized value;

producing means for producing the first current as said load current; and a resistor through which said second current is caused to flow and across which a shared voltage is developed, as said source voltage, said shared voltage providing voltage of each of said power sources.

2. A power source system as claimed in claim 1, wherein said detecting means is coupled to said electric source and comprises:

current delivering means having said negative resistance characteristic for delivering said first and said second currents to said providing means and to said resistor, respectively; and control signal supplying means coupled to said current delivering means and to said electric source for supplying said electric source with a control voltage dependent on said first and said second currents.

3. A power source system as claimed in claim 1, wherein said detecting means of each power source comprises:

first means for monitoring the source voltage of each of said power sources to detect whether or not the rate of the source voltage of each of said power sources exceeds a preselected value between said low and said high normalized values; and second means coupled to said first means for producing said source voltage and source current, in accordance with said negative resistance characteristic between said low normalized value and said preselected value and in accordance with a positive resistance characteristic which is different from said negative resistance characteristic between said preselected and said high normalized values.

4. A power source system for supplying a load with a load voltage and a load current, said system comprising a plurality of power sources, each of said power sources producing a source voltage and a source current, and coupling means for coupling said plurality of the power sources in parallel with said load in order to deliver the source currents of the respective power sources to said load as said load current, with rates determined by the source currents of the respective power sources and with the source voltage of each of said power sources left variable when each of said rates is varied between low and high normalized values, each power source comprising:

an electric source for producing a d.c. source voltage;

a resistor through which a d.c. current is caused to flow from said source current and across which said source voltage appears in response to said d.c. voltage, said d.c. current providing the rate of each of said power sources; and detection means coupled to said electric source for detecting said d.c. current to supply a control signal to said electric source in response to said d.c. current, in order to provide a negative resistance characteristic which is such that the source voltage increases when the rate increases from said low normalized value toward said high normalized value.

5. A power source system as claimed in claim 4, wherein said detection means of each power source comprises:

first means for monitoring said d.c. current of each of said power sources to detect whether or not the rate of the d.c. current of each of said power sources exceeds a preselected value between said low and said high normalized values; and second means coupled to said first means for producing said control signal such that said source voltage increases in accordance with said negative resistance characteristic between said low normalized value and said preselected value and in accordance with a positive resistance characteristic which is different from said negative resistance characteristic between said preselected and said high normalized values.

* * * * *